United States Patent
Terry et al.

(10) Patent No.: US 7,430,206 B2
(45) Date of Patent: Sep. 30, 2008

(54) WIRELESS COMMUNICATION METHOD AND APPARATUS FOR DETECTING AND CORRECTING TRANSMISSION ERRORS

(75) Inventors: Stephen E. Terry, Northport, NY (US);
Yi-Ju Chao, Minnetonka, MN (US);
James M. Miller, Verona, NJ (US);
Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1014 days.

(21) Appl. No.: 10/434,882

(22) Filed: May 9, 2003

(65) Prior Publication Data

US 2004/0004954 A1    Jan. 8, 2004

Related U.S. Application Data

(60) Provisional application No. 60/379,882, filed on May 10, 2002.

(51) Int. Cl.
*G01R 31/08* (2006.01)
(52) U.S. Cl. .................. 370/394; 370/412; 714/748
(58) Field of Classification Search ............. 370/473, 370/349
See application file for complete search history.

(56) References Cited

U.S. PATENT DOCUMENTS

| | | | |
|---|---|---|---|
| 5,343,480 A | 8/1994 | Hasegawa | |
| 6,330,699 B1 * | 12/2001 | Yoshioka et al. | 714/746 |
| 7,075,891 B2 * | 7/2006 | Hu et al. | 370/236 |
| 7,124,333 B2 * | 10/2006 | Fukushima et al. | 714/701 |
| 2003/0086391 A1 | 5/2003 | Terry et al. | |
| 2003/0123403 A1 * | 7/2003 | Jiang | 370/328 |
| 2003/0125056 A1 * | 7/2003 | Jiang | 455/466 |
| 2003/0128705 A1 | 7/2003 | Yi et al. | |
| 2003/0147348 A1 * | 8/2003 | Jiang | 370/229 |
| 2003/0147370 A1 * | 8/2003 | Wu | 370/338 |
| 2003/0228876 A1 * | 12/2003 | Hwang | 455/522 |
| 2004/0203980 A1 * | 10/2004 | Das et al. | 455/522 |
| 2005/0073987 A1 * | 4/2005 | Wu | 370/349 |

FOREIGN PATENT DOCUMENTS

WO    01/80476    10/2001

OTHER PUBLICATIONS

3$^{rd}$ Generation Partnership Project; Technical Specification Group Radio Access Network; UTRA High Speed Downlink Packet Access (HSDPA); Overall description; Stage 2 (Release 5) 3GPP TS 25.308 V5.0.0 (Sep. 2001), pp. 15-18.

(Continued)

*Primary Examiner*—Chau Nguyen
*Assistant Examiner*—Suk Jin Kang
(74) *Attorney, Agent, or Firm*—Volpe and Koenig, P.C.

(57) ABSTRACT

A wireless communication system is configured to monitor transmission sequence numbers (TSNs) assigned to protocol data units (PDUs) processed by the system. The system includes at least one user equipment (UE) having a queue, and a Node B in communication with the UE. The UE determines that a data block having an expected TSN was not received, and generates a TSN status report message. The Node B retransmits a data block including the expected TSN to the UE in response to the TSN status report message. The retransmitted data block is placed in a specific location in the queue designated by the TSN status report message.

19 Claims, 5 Drawing Sheets

OTHER PUBLICATIONS

Ericsson "Uplink signaling for Hybrid ARQ" 3GPP TSG RAN WG 1, May 21, 2001, pp. 1-4.

Motorola "Control Channel Structure for High Speed DSCH (HS-DSCH)" TSG RAN Working Group Meeting, Oct. 10, 2000, pp. 1-3.

* cited by examiner

WIRELESS COMMUNICATION METHOD AND APPARATUS FOR DETECTING AND CORRECTING TRANSMISSION ERRORS

CROSS REFERENCE TO RELATED APPLICATIONS

This application claims priority from Provisional Patent Application No. 60/379,882, filed May 10, 2002.

FIELD OF THE INVENTION

The present invention relates to the field of wireless communications. More specifically, the present invention relates to a system and method for monitoring transmission sequence numbers (TSNs) assigned to protocol data units (PDUs) to detect and correct transmission errors.

BACKGROUND

In conventional third generation (3G) cellular systems, signaling between at least one User Equipment (UE) and Base Stations (Node-Bs) for the coordination of Adaptive Modulation and Coding (AM&C) and Hybrid Automatic Repeat Request (H-ARQ) functions is provided by physical control channels, such as High Speed Data Packet Access (HSDPA) control channels, or the like. When transmission errors occur on physical control channels for either the uplink or downlink, existing Medium Access Control (MAC) layer mechanisms are not able to guarantee recovery and as a result user data may be lost.

In order to ensure delivery of a data block, the H-ARQ process employs messages which confirm or deny that a data block was successfully delivered. An acknowledgment (ACK) message indicates a successful transmission of a data block, while a negative acknowledgment (NACK) message indicates a failed transmission of a data block. When there is a successful transmission data block, an ACK is generated and no further action is taken. When there is a failed transmission of a data block, a NACK is generated and, in response thereto, the respective data block is retransmitted.

One drawback with the H-ARQ process is that ACK and NACK messages, which are usually generated by a receiver, are often misinterpreted. If a NACK message is misinterpreted as being an ACK message, a failure occurs without being detected at the physical level. If an ACK message is misinterpreted as being a NACK, the data block is unnecessarily retransmitted.

The H-ARQ process provides a mechanism whereby the status of transmissions that are received are indicated to the transmitter. The retransmitted data blocks are combined in the receiver with other successful transmissions to achieve reduced block error rates. For the combining process to work correctly in the receiver, the same protocol data unit (PDU) must be applied in retransmissions as for the initial transmission. For each transmission time interval (TTI), one H-ARQ process may service one PDU. The initial transmission and retransmissions of a particular PDU are serviced by the same H-ARQ processor.

Figure 1:
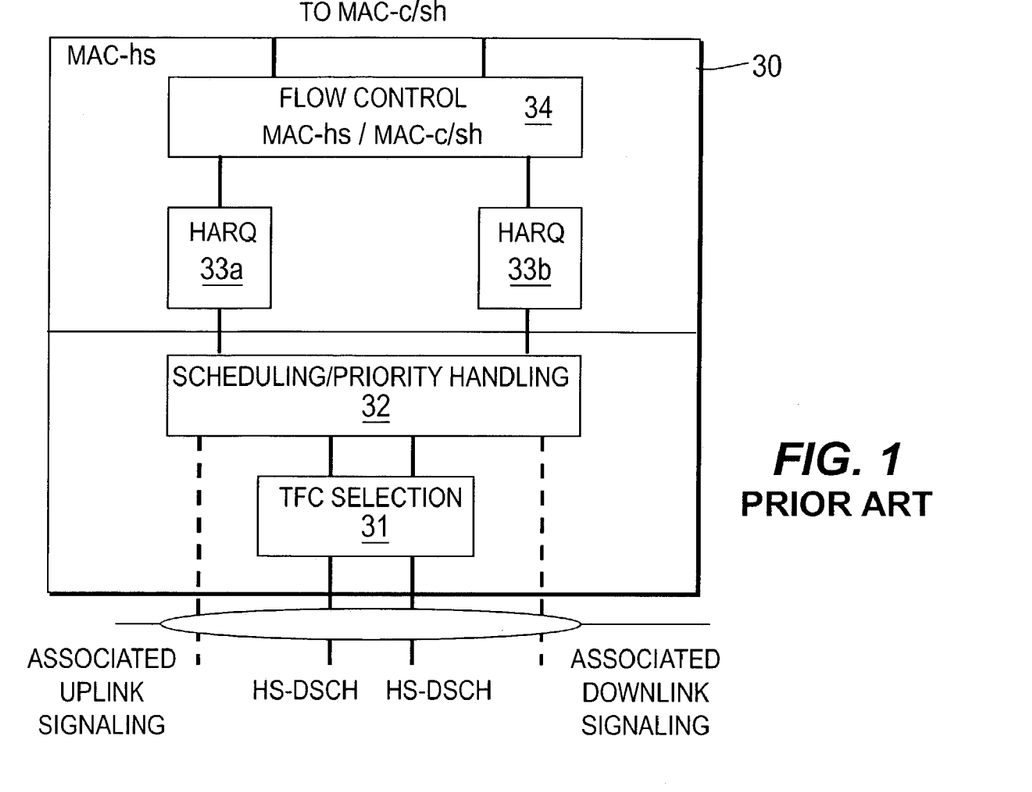
FIG. 1 is a prior art UTRAN MAC-hs.
Figure 2:
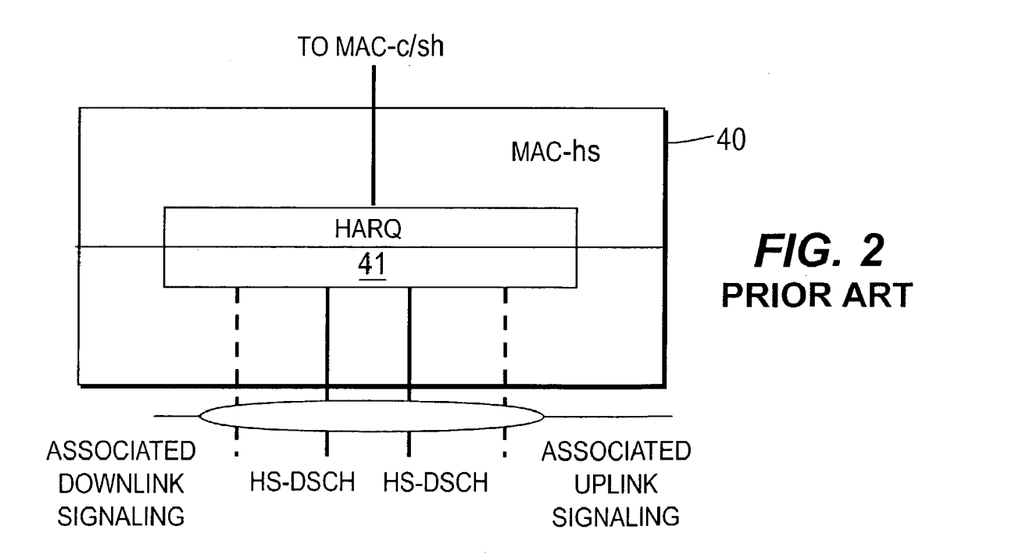
FIG. 2 is a prior art UE MAC-hs.

A block diagram of the UMTS Terrestrial Radio Access Network (UTRAN) MAC-hs layer architecture is illustrated in FIG. 1, and a block diagram of the user equipment (UE) MAC hs architecture is shown in FIG. 2. The UTRAN MAC-hs 30 shown in FIG. 1 comprises a Transport Format Combination (TFC) selection entity 31, a scheduling device 32, a plurality of H-ARQ processors 33a, 33b and a flow controller 34.

The UE MAC-hs 40 comprises an H-ARQ processor 41. As will be explained with reference to both FIGS. 1 and 2, the H-ARQ processors 33a, 33b in the UTRAN MAC-hs 30 and the H-ARQ processor 41 in the UE MAC-hs 40 work together to process blocks of data.

The H-ARQ processors 33a, 33b in the UTRAN MAC-hs 30 handle all of the tasks that are required for H-ARQ to generate transmissions and retransmissions for any transmission that is in error. The H-ARQ processor 41 in the UE MAC-hs 40 is responsible for generating a ACK to indicate a successful transmission and for generating a NACK to indicate a failed transmission. The H-ARQ processors 33a, 33b and 41 process sequential data streams for each user data flow.

As will be described in further detail hereinafter, blocks of data received on each user data flow are sequentially assigned to H-ARQ processors 33a, 33b. Each H-ARQ processor 33a, 33b initiates a transmission, and in the case of an error, the H-ARQ processor 41 requests a retransmission. On subsequent transmissions, the modulation and coding rate may be changed in order to ensure a successful transmission. The data block to be retransmitted and any new transmissions to the UE are forwarded to the scheduling device 32.

The scheduling device 32, coupled between the H-ARQ processors 33a, 33b and the TFC selector 31, functions as radio resource manager and determines transmission latency in order to support the required QoS. Based on the outputs of the H-ARQ processors 33a, 33b and the priority of a new data block being transmitted, the scheduling device 32 forwards the data block to the TFC selection entity 31.

The TFC selection entity 31, coupled to the scheduling device 32, receives the data block to be transmitted and selects an appropriate dynamic transport format for the data block to be transmitted. With respect to H-ARQ transmissions and retransmissions, the TFC selection entity 31 determines modulation and coding.

It is highly desirable for the retransmitted data blocks to arrive at the RLC entity of the receiving side (i.e., the UE) as soon as possible for several reasons. First, the missed data block will prevent subsequent data blocks from being forwarded to higher layers, due to the requirement of in-sequence delivery. Second, the buffer of the UE needs to be sized large enough to accommodate the latency of retransmissions while still maintaining effective data rates. The longer the latency is, the larger the UE buffer size has to be to allow for the UE to buffer both the data blocks that are held up and continuous data receptions until the correct sequence data block is forwarded to higher layers. The larger buffer size results in increased hardware costs for UEs. This is very undesirable.

Figure 3:
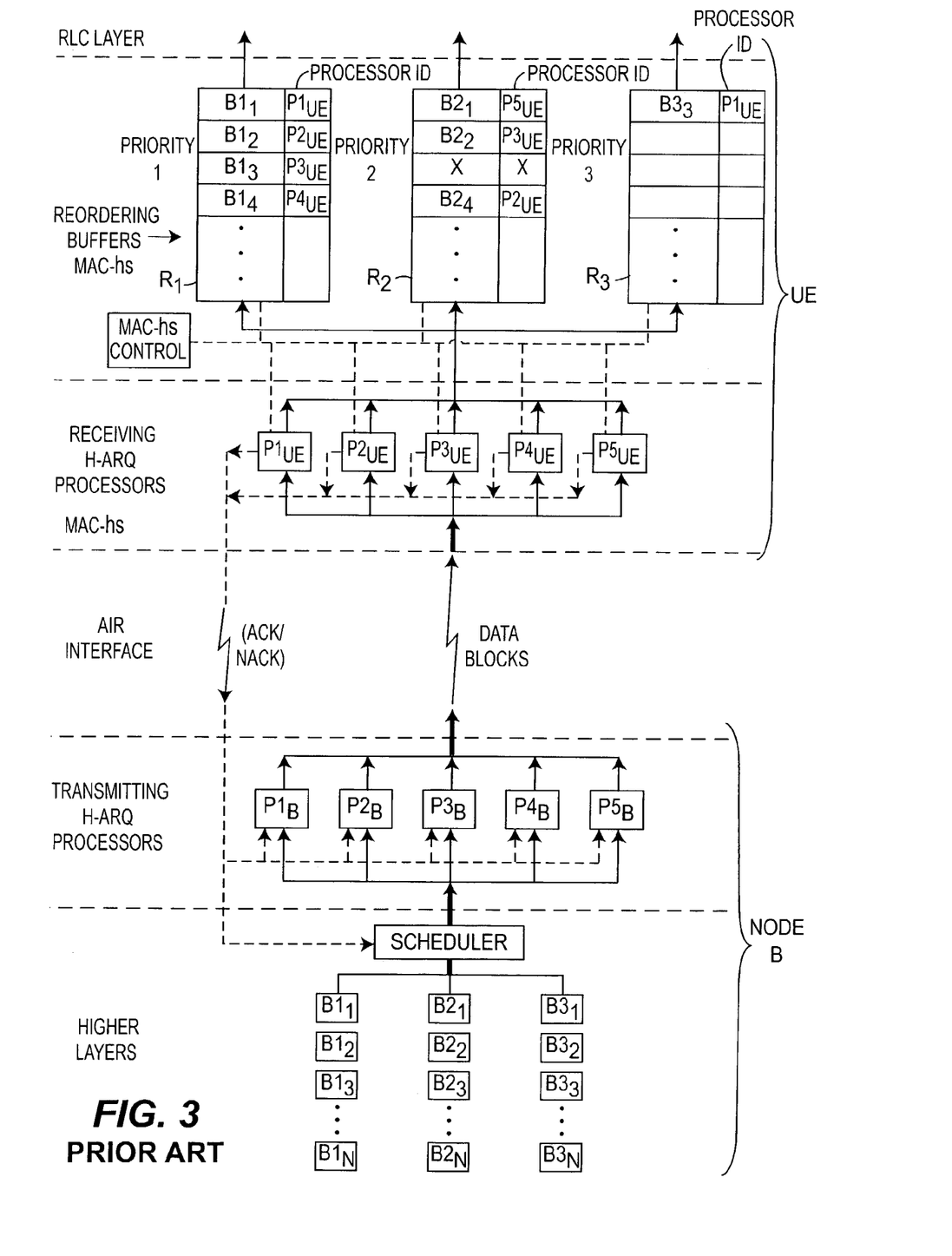
FIG. 3 is prior art a block diagram of the data flow between a Node B and a UE.

Referring to FIG. 3, a flow diagram of the data flow between a Node B (shown at the bottom of FIG. 3) and a UE (shown at the top of FIG. 3) is shown. PDUs from higher level processing are scheduled and may be multiplexed into one data block. A data block can only contain PDUs of higher layers of the same priority. A unique Transmission Sequence Number (TSN) is assigned to each data block by the scheduler. The higher layers may provide a plurality of streams of different priorities of PDUs, each priority having a sequence of TSNs. The scheduler then dispatches the data blocks to the plurality of H-ARQ processors $P1_B$-$P5_B$. Each H-ARQ processor $P1_B$-$P5_B$ is responsible for processing a single data block at a time. For example, as shown in FIG. 3, the Priority 1 PDUs comprise a sequence illustrated as $B1_1$-$B1_N$. Likewise, the Priority 2 PDUs are sequenced from $B2_1$-$B2_N$ and the Priority 3 PDUs are sequenced from $B3_1$-$B3_N$. These PDUs are scheduled (and may be multiplexed) and affixed a TSN by the common scheduler. For purposes of describing the invention, it is assumed that one PDU equals one data block. After a data block is scheduled to be processed by a particular processor $P1_B$-$P5_B$, each data block is associated with a processor identifier, which identifies the processor $P1_B$-$P5_B$ that processes the data block.

The data blocks are then input into the scheduled Node B H-ARQ processors $P1_B$-$P5_B$ which receive and process each data block. Each Node B H-ARQ processor $P1_B$-$P5_B$ corresponds to an H-ARQ processor $P1_{UE}$-$P5_{UE}$ within the UE. Accordingly, the first H-ARQ processor $P1_B$ in the Node B communicates with the first H-ARQ processor $P1_{UE}$ in the UE. Likewise, the second H-ARQ processor $P2_B$ in the Node B communicates with the second H-ARQ processor $P2_{UE}$ in the UE, and so on for the remaining H-ARQ processors $P3_B$-$P5_B$ in the Node B and their counterpart H-ARQ processors $P3_{UE}$-$P5_{UE}$ respectively within the UE. The H-ARQ processes are timely multiplexed onto the air interface and there is only one transmission of an H-ARQ on the air interface at one time.

For example, taking the first pair of communicating H-ARQ processors $P1_B$ and $P1_{UE}$, the H-ARQ processor $P1_B$ processes a data block, for example $B1_1$, and forwards it for multiplexing and transmitting it over the air interface. When this data block $B1_1$ is received by the first H-ARQ processor $P1_{UE}$, the processor $P1_{UE}$ determines whether or not it was received without error. If the data block $B1_1$ was received without error, the first H-ARQ processor $P1_{UE}$ transmits an ACK to indicate to the transmitting H-ARQ processor $P1_B$ that it has been successfully received. On the contrary, if there is an error in the received data block $B1_1$, the receiving H-ARQ processor $P1_{UE}$ transmits a NACK to the transmitting H-ARQ processor $P1_B$. This process continues until the transmitting processor $P1_B$ receives an ACK for the data block $B1_1$. Once an ACK is received, that processor $P1_B$ is "released" for processing another data block. The scheduler will assign the processor $P1_B$ another data block if available.

As graphically illustrated in FIG. 3, the scheduler knows of the release of the processor $P1_B$ by receiving the ACK/NACK, or may use some other signaling scheme that is well known in the art.

Once the receiving H-ARQ processors $P1_{UE}$-$P5_{UE}$ process each data block, they are forwarded to the reordering buffers $R_1$, $R_2$, $R_3$ based on their priority; one reordering buffer for each priority level of data. For example, Priority 1 data block $B1_1 B1_N$ will be received and reordered in the Priority 1 reordering buffer $R_1$; Priority 2 data blocks $B2_1$-$B2_N$ will be received and reordered in the Priority 2 reordering buffer $R_2$; and the Priority 3 data blocks $B3_1$-$B3_N$ will be received and reordered by the Priority 3 reordering buffer $R_3$. Due to the pre-processing of the data blocks by the receiving H-ARQ processors $P1_{UE}$-$P5_{UE}$ and the ACK/NACK acknowledgement procedure, the data blocks are often received in an order that is not sequential with respect to their TSNs. The reordering buffers $R_1$-$R_3$ receive the out-of-sequence data blocks and attempt to reorder the data blocks in a sequential manner based upon TSNs. It should be noted that each reordering buffer has its own sequence of TSNs. As the data blocks are received and reordered, they will be passed to higher layers, such as the RLC layer.

On the receiving side, the UE MAC-hs, (which has been graphically illustrated as MAC-hs control), reads the H-ARQ processor ID, whether it is sent on a control channel such as the HS-SCCH or whether the data block has been tagged, to determine which H-ARQ processor $P1_{UE}$-$P5_{UE}$ has been used. If the UE receives another data block to be processed by the same H-ARQ processor $P1_{UE}$-$P5_{UE}$, the UE knows that that particular H-ARQ processor $P1_{UE}$-$P5_{UE}$ has been released regardless of whether or not the previous data block processed by that H-ARQ processor $P1_{UE}$-$P5_{UE}$ has been successfully received.

Figure 4:
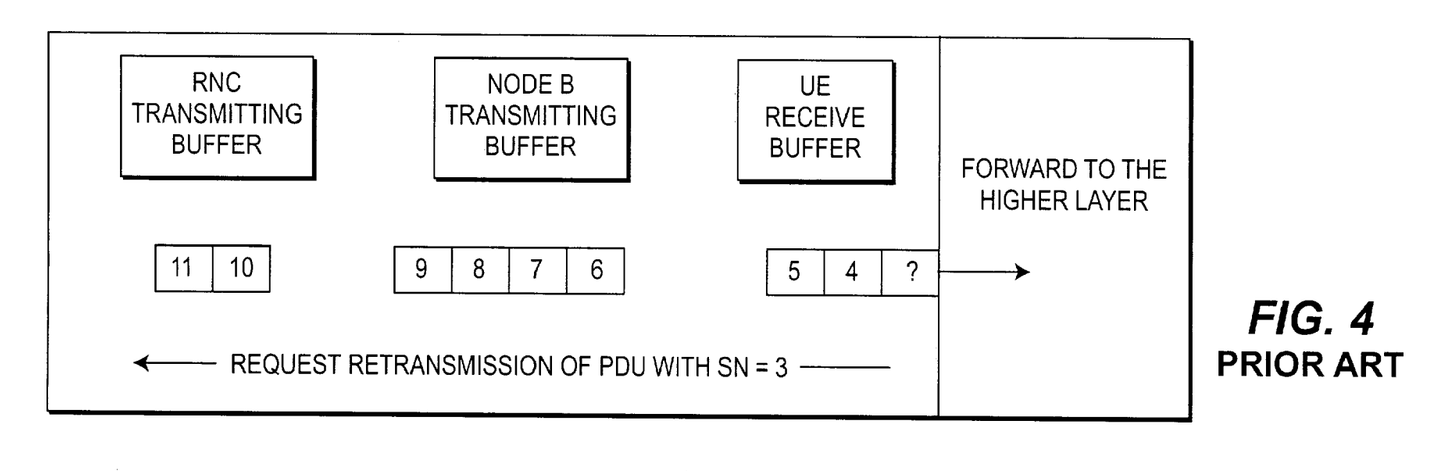
FIG. 4 is a prior art diagram of the RLC layer exhibiting a missed PDU transmission.

As aforementioned the PDUs are forwarded to the higher layer if all the PDUs with embedded TSNs are successfully received, or a timer indicates that the maximal period of time that the PDU can stay in a buffer or queue has been reached. Typically, the higher layer is the RLC. While the process described with reference to FIG. 3 is being implemented, the data being buffered in the reordering buffers $R_1$, $R_2$, $R_3$ is subject to a delay. As shown in FIG. 4, this delay can have negative consequences.

FIG. 4 is an example of a prior art system including an RNC, a Node B a UE and their associated buffers. This example assumes that the UE is the receiving entity and the Node B is the transmitting entity. In this prior art system, a PDU with TSN=3 is not received successfully by the UE. Therefore, the UE requests a retransmission. Meanwhile, the PDUs with TSNs=6-9 are buffered in the Node B, and PDUs with TSNs=4 and 5 are buffered in the UE.

Figure 5:
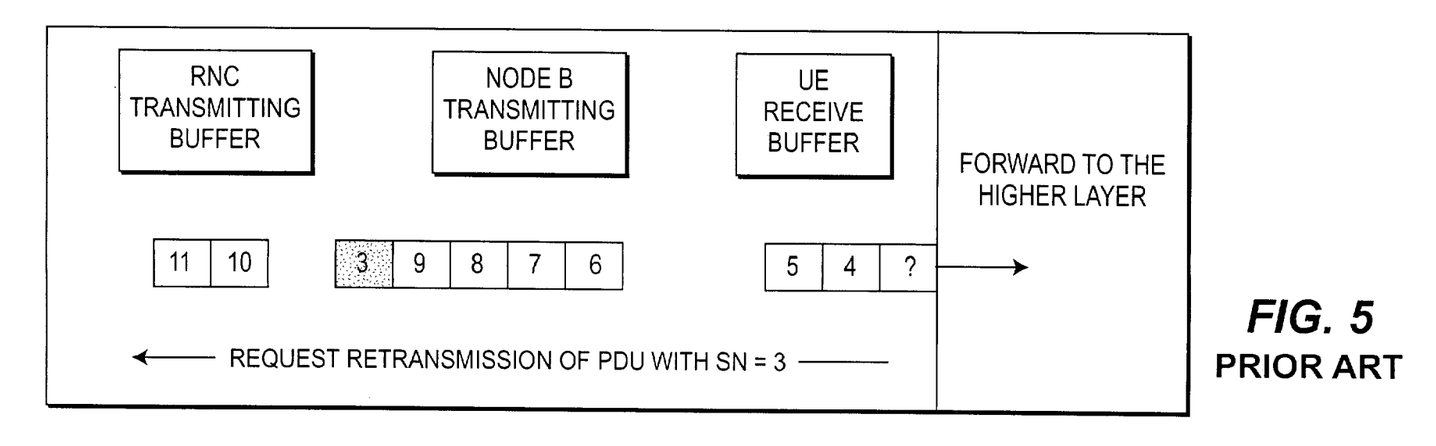
FIG. 5 is a prior art diagram of retransmission by the RLC layer of the missed PDU transmission.

As shown in FIG. 5, the retransmission of the PDU with TSN=3 must wait at the end of the queue in the Node B buffer, and will be transmitted only after the PDUs with TSNs=6-9 are transmitted. The PDUs in the UE cannot be forwarded to the upper layers until all PDUs are received in sequence. In this case, the PDU with TSN=3 stalls the forwarding of subsequent PDUs to higher layers, (i.e., TSNs=4-9), assuming all the PDUs are transmitted successfully. Note that the example of FIGS. 4 and 5 only reflects 11 PDUs, whereas in normal operation hundreds of PDUs along with PDUs from other RLC entities maybe scheduled in advance of retransmitted data PDUs, which further aggravates transmission latency and data buffering issues.

In addition to the delay due to the buffers, there is another significant drawback with the prior art H-ARQ process. The signaling for the H-ARQ process is performed over a physical channel. As those of skill in the art realize, physical channels are channels which are particularly defined and pre-determined. These channels are typically not subject to an error checking capability. As a result, there is a high probability that misinterpretation due to corruption of the signaling will result. For example, an ACK transmitted by the UE may be corrupted during transmission, which results in the detection by the Node B as a NACK. As a result, the data will be unnecessarily retransmitted, thereby wasting radio resources.

Alternatively, a NACK may be misinterpreted as an ACK. In this case, the failed transmission will not be detected by the H-ARQ process. When this occurs, the physical layer mechanism is unable to recover the data and a higher layer, such as the radio-link control (RLC) layer, initiates mechanisms to recover the lost data.

One disadvantage of relying on the RLC layer to retransmit missed PDUs is the latency of transmission, since the round-trip delay of the retransmission is significantly longer than that of transmissions at the H-ARQ level.

SUMMARY

The present invention is a system and method for detecting and correcting transmission errors in a wireless communication system. A plurality of data blocks are received and temporarily stored in a queue. Each data block includes a unique transmission sequence number (TSN). When it is determined that a data block having an expected TSN was not received, a TSN status report message is generated to indicate that the expected TSN was not received. A data block including the expected TSN is then retransmitted in response to the TSN status report message. The retransmitted data block is placed in a specific location in the queue designated by the TSN status report message.

The TSN status report message may be transmitted over an uplink dedicated physical control channel—high speed (DPCCH-HS). The DPCCH-HS has a structure with three fields including (i) a transmission status field for carrying ACK/NACK information; (ii) a channel qualifier identifier (CQI) field; and (iii) a TSN field. Each field may be located in one or more timeslots of a transmission time interval (TTI) of the DPCCH-HS. The TSN status report message may include a reordering queue indicator used to place the retransmitted data block in a specific location in the queue. The present invention provides redundant error detection, whereby a signal previously (and incorrectly) interpreted to be an ACK may later be determined to actually be a NACK.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The preferred embodiments will be described with reference to the drawing figures where like numerals represent like elements throughout.

Figure 6:
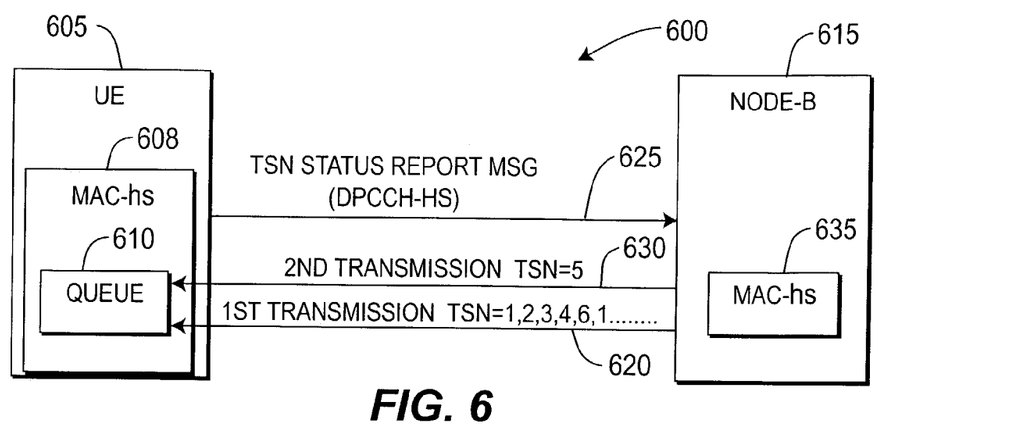
FIG. 6 is a block diagram of a wireless communication system operating in accordance with a preferred embodiment of the present invention.

FIG. 6 shows an exemplary wireless communication system 600 operating in accordance with a preferred embodiment of the present invention. The wireless communication system 600 is configured to monitor transmission sequence numbers (TSNs) assigned to protocol data units (PDUs) processed by the system 600. The system 600 includes at least one user equipment (UE) 605 having MAC-hs entity 608 with a queue 610 and a Node B 615 having a MAC-hs entity 635. The MAC-hs entity 608 in the UE 605 communicates with the peer MAC-hs entity 635 in the Node B 615. It would be understood by those skilled in the art that the details of the MAC-hs entity 608 in the UE 605 and the MAC-hs entity 635 in the Node B 615 are the same as the system shown in FIG. 3 and described in reference thereto. However, those details are not shown again in FIG. 6 for simplicity. Accordingly, the queue 610 of FIG. 6 is equivalent to the reordering buffers $R_1$ $R_2$, $R_3$ of FIG. 3.

The UE 605 receives numerous data blocks via a first transmission 620 having TSNs 1, 2, 3 . . . until it determines that a data block having an expected TSN (e.g., TSN=5) was not received. The MAC-hs entity 608 generates a TSN status report message 625 indicating that the expected TSN was not received. The MAC-hs entity 635 in the Node B 615 receives the TSN status report message 625 retransmits via a second transmission 630 a data block associated with the expected TSN (TSN=5) to the UE 605 in response to the TSN status report message 625, and the retransmitted data block is placed in a specific location in the queue 610 designated by the TSN status report message 625.

In order to reduce the latency and to improve reliability of retransmission of a PDU, the MAC-hs entity 608 in the UE 605 feeds back the TSN status report message 625 to the MAC-hs entity 635 of the Node B 615 via an uplink dedicated physical control channel—high speed (DPCCH-HS). Once the TSN status report message 625 is received from the UE 605, the MAC-hs is entity 635 of the Node B 615 retransmits a duplication of the PDU with the same TSN as the missed TSN to the UE 605. It should be noted that the Node B 615 occasionally intentionally abandons transmissions due to scheduling reasons, (e.g., PDUs with higher priority pre-empty H-ARQ processes). On these occasions, the MAC-hs entity 635 can simply overlook the TSN status report message 625.

In accordance with a preferred embodiment of the present invention, the TSN status report message 625 identifies a missing TSN that is expected by the UE 605 but not received. Specifically, the missing TSN corresponds to the PDU for which the UE 605 responded with a NACK to the Node B 615, since the PDU was not received by the UE 605.

As aforementioned, the occurrence of a misinterpretation of NACK to ACK by the Node B 615 causes the Node B to mistakenly consider the transmission of the PDU to be successful when it is not. However, implementing a system in accordance with the present invention, the UE 605 generates and sends a TSN status report message 625 to the Node B 615 when a TSN is missed. The UE 605 informs the Node B 615, via the TSN status report message 625 of the missing TSN, and provides a reordering queue identifier. The Node B 615 is made aware that a transmission error occurred (e.g., a detected ACK was really a NACK), and the missing TSN is then retransmitted via the second transmission 630 and placed in the queue 610 according to the reordering queue identifier. Thus, a redundant error detection scheme is provided, whereby if a failure in ACK/NACK detection occurs, the TSN status report message 625 is implemented as a backup.

One of the problems with generating the TSN status report message 625 is that there are a scarcity of physical control bits in order to signal the TSN status report message 625 in a physical channel as is currently defined in 3G standards. As will be described in detail hereinafter In one embodiment, the information provided by the TSN status report message 625 is incorporated into signaling that may include ACK/NACK or channel quality measurements, thus yielding an expanded return feedback channel that can run over multiple slots. This is unlike conventional feedback mechanisms which use only one slot.

The TSN status report message 625 requires signaling of "X+Y" bits; in which X bits are used for the TSN and Y bits are used for the identifier of the particular reordering queue to which the TSN is destined.

As would be understood by those of skill in the art, there is also other information carried on the uplink DPCCH-HS, for example, ACK/NACK information and channel quality identifier (CQI) information. Several different methods may be used to allow Node B 615 to differentiate fields of information. In a preferred embodiment, a preconfigured pattern of the positions of the fields indicated by the sequence number of a timeslot is known by both the UE 605 and the Node B 615, (e.g., a periodic pattern 1, 2, 3, 4, 5, 6, 1, 2 . . . ). When the periodic pattern is known to both the UE and the Node B, the Node B needs only to look in the specific timeslot for the information it requires, (i.e. the ACK/NACK, the CQI or the TSN). For example, the periodic pattern of the ACK/NACK, the CQI and the TSN report could be such that on a particular slot either the CQI or the TSN report could be sent. By adding a single bit, the Node B 615 can differentiate whether the field contains the CQI or a TSN report.

Figure 7:
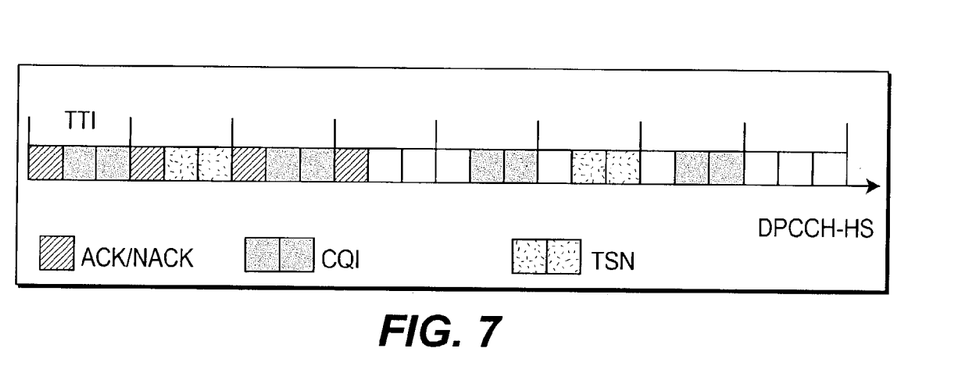
FIG. 7 illustrates a DPCCH-HS channel structure used to carry TSN with discontinuous CQI.

FIG. 7 shows a preferred embodiment of the DPCCH-HS structure to carry the status of a missed TSN. Each TTI is comprises three timeslots, and there are three fields to be transmitted in the uplink DPCCH-HS: 1) the transmission status field which transmits the ACK/NACK signaling; 2) the CQI field which transmits the CQI; and 3) the TSN field which transmits the TSN status report message.

The transmission status field includes an ACK or NACK which contains 1 bit for information that is transmitted in one timeslot of the DPCCH-HS structure. When a transmission of a PDU occurs, the UE transmits either an ACK or a NACK in response to the transmission as appropriate.

The CQI field is used by the UE to periodically feed back the channel quality to the transmitting side (i.e., the Node B). The period of feedback is typically preconfigured and known by both the receiving side (i.e., the UE) and the transmitting side (i.e., the Node B). The CQI field is transmitted in two timeslots and the repetition periods of the CQI field may vary. It is also possible that the CQI field may appear numerous times in each period. The repetition periods and the number of occurrences in a repetition period of the CQI field are signaled by the higher layer, and is outside the scope of the present invention. However, both the UE and the Node B are aware of the positions of its CQI field.

The TSN field is used by the UE to feed the TSN status report message back to the Node B. The TSN field contains nine bits for information and is transmitted in two timeslots.

Referring back to FIG. 7, the first timeslot of a TTI is used either for the ACK/NACK signaling or is empty. The second and the third timeslots are used either for the CQI field or for the TSN field. In the example of FIG. 7, the CQI field repeats every two TTIs, and only appears once in the repetition period. The TSN field is sent when the timeslots (i.e., preconfigured) are not used to transmit the CQI field. The TSN field may repeat every two TTIs, or may appear only when the UE wants to send the TSN status report message. If the signaling is not preconfigured, the Node B requires continuous monitoring of the DPCCH-HS. The TSN field is sent in the second and third timeslots.

In an alternative embodiment, the feedback of the TSN status report message can be dependent upon a predetermined window which indicates a range of missed TSNs that is to be fed back to the Node B 615. This is done either by signaling explicit ranges, or by including a bit map (one bit for each TSN) used to signal multiple missing TSNs.

The TSN status report message feedback may also be based on a timer that indicates an expiration time before which a missed TSN is to be fed back to the Node B. For each TSN transmission, a timer is used in the UE and/or the Node B while waiting for a TSN transmission to properly transmitted via the H-ARQ process. When the timer expires, the UE stops waiting for the PDU associated with the missing TSN, and forwards all other PDUs to higher layers, (such as the RLC layer). Thereafter the Node B discards the missed TSN because the UE is no longer waiting for it.

However, in the case when a NACK is interpreted as an ACK, the timer is unavailable to the Node B and the UE maintains the timer. For example, if the expiration timer is set to 400 ms and the TSN status report message needs to be sent after 300 ms, it would be useful for the Node B to be informed that the UE will timeout on a missed TSN after 100 ms more. Thus, the Node B benefits by knowing the amount of time it has to recover the missed TSN.

Figure 8:
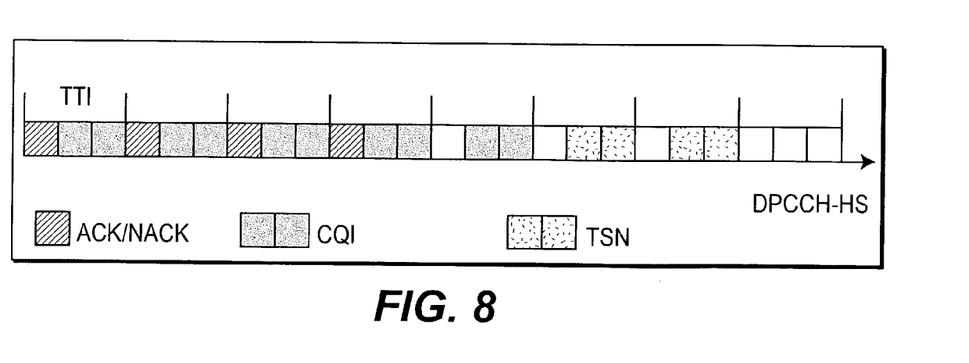
FIG. 8 depicts a DPCCH-HS channel structure used to carry TSN with continuous CQI.

Referring to a second example in FIG. 8, the first timeslot of a TTI is either for ACK/NACK or is empty. The second and the third timeslots are used either for the CQI field or for the TSN field. In this case, the Node B needs to be pre-informed of the positions of the TTIs used for the TSN field and the TTIs used for ACK/NACK and the CQI field, or one bit is required to differentiate between the TTIs for different purposes.

Figure 9:
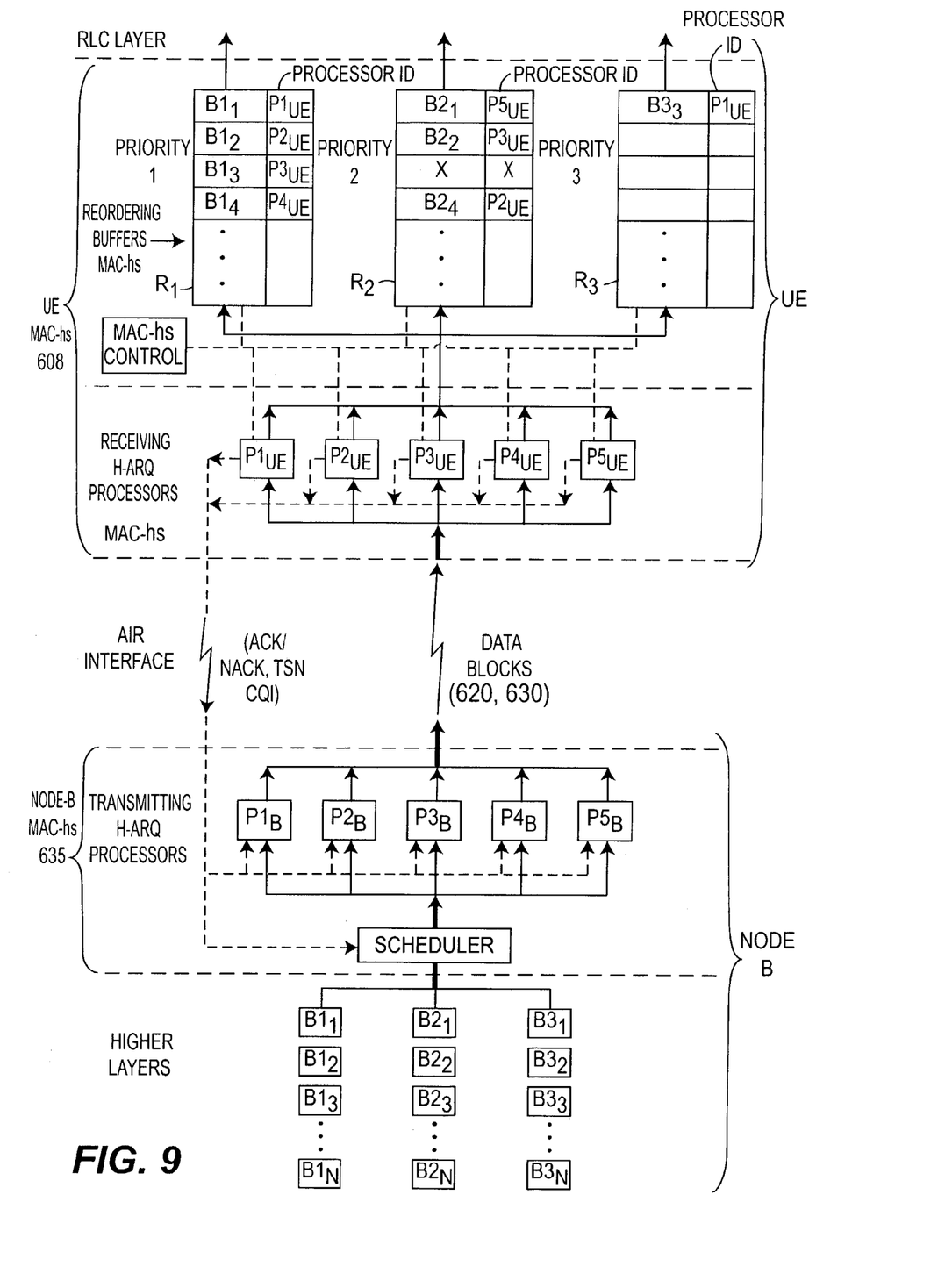
FIG. 9 is a block diagram of the data flow between a Node B and a UE in accordance with the present invention.

Referring to FIG. 9, a block diagram of the data flow between Node B and a UE in accordance with the present invention is shown. The peer-to-peer UE and Node B MAC-hs entities 608, 635 respectively, communicate in order to ensure the proper delivery of data. As shown, data transmissions 620, 630 are sent from the Node B MAC-hs entity 635 to the UE MAC-hs 608. In response, along with ACK/NACK and CQI messaging, the TSN status report message 625 is sent from the UE MAC-hs entity 608 to the Node B MAC-hs 635. This provides a redundant confirmation of the delivery of a data block.

While the present invention has been described in terms of the preferred embodiment, other variations which are within the scope of the invention as outlined in the claims below will be apparent to those skilled in the art.

What is claimed is:

1. A method of detecting and correcting transmission errors, the method comprising:
   receiving a plurality of data blocks via a first transmission, each data block including a unique transmission sequence number (TSN);
   determining that a data block having an expected TSN was not received via the first transmission;
   generating a TSN status report message that identifies a missing TSN corresponding to the data block that was not received via the first transmission, the TSN status report message including a first set of bits used to identify the missing TSN and a second set of bits used to identify a particular reordering queue to which the missing TSN is destined;
   retransmitting a data block including the missing TSN via a second transmission in response to receiving the TSN status report message; and
   placing the retransmitted data block in a specific location in the particular reordering queue designated by the second set of bits of the TSN status report message.

2. The method of claim 1 wherein the TSN status report message is transmitted over an uplink dedicated physical control channel-high speed (DPCCH-HS).

3. The method of claim 2 wherein the DPCCH-HS has a structure with three fields including:
   a transmission status field for carrying acknowledgement/negative acknowledgement (ACK/NACK) information;
   a channel qualifier identifier (CQI) field; and
   a TSN field.

4. The method of claim 3 wherein each field is located in one or more timeslots of a transmission time interval (TTI) of the DPCCH-HS.

5. The method of claim 1 wherein the TSN status report message includes a reordering queue indicator used to place the retransmitted data block in the specific location in the particular reordering queue.

6. The method of claim 1, further comprising:
detecting a signal interpreted to be an acknowledgement (ACK); and
based on the TSN status report message, determining that the detected signal was interpreted incorrectly and is actually a negative acknowledgement (NACK).

7. A user equipment (UE) comprising:
a reordering queue; and
a first medium access control (MAC) entity configured to generate a transmission sequence number (TSN) status report message, wherein the UE is configured to receive a plurality of data blocks via a first transmission, each data block including a unique TSN and determine when a data block having an expected TSN was not received via the first transmission, and the TSN status report message identifies a missing TSN corresponding to the data block that was not received by the UE via the first transmission, the TSN status report message including a first set of bits used to identify the missing TSN and a second set of bits used to identify the reordering queue to which the missing TSN is destined.

8. The UE of claim 7 wherein the TSN status report message is transmitted over an uplink dedicated physical control channel-high speed, DPCCH-HS.

9. The UE of claim 8 wherein the DPCCH-HS has a structure with three fields including:
a transmission status field for carrying acknowledgement/negative acknowledgement (ACK/NACK) information;
a channel qualifier identifier (CQI) field; and
a TSN field.

10. The UE of claim 9 wherein each field is located in one or more timeslots of a transmission time interval (TTI) of the DPCCH-HS.

11. The UE of claim 7 wherein the TSN status report message includes a reordering queue indicator used to place the retransmitted data block in the specific location in the reordering queue.

12. The UE of claim 7 wherein the TSN status report message indicates that a signal interpreted as being an acknowledgement (ACK) was interpreted incorrectly and is actually a negative acknowledgement (NACK).

13. A method of detecting and correcting transmission errors, the method comprising:
sending a first transmission that includes a plurality of data blocks, each data block including a unique transmission sequence number (TSN);
receiving the first transmission; and
sending a TSN status report message that includes a first set of bits that identify a missing TSN corresponding to a data block that was not received via the first transmission, and a second set of bits that identify a particular reordering queue to which the missing TSN is destined.

14. The method of claim 13 further comprising:
receiving the TSN status report message;
sending a data block including the missing TSN via a second transmission; and
placing the data block including the missing TSN in a specific location in the particular reordering queue designated by the second set of bits of the TSN status report message.

15. The method of claim 14 wherein the TSN status report message is transmitted over an uplink dedicated physical control channel-high speed (DPCCH-HS).

16. The method of claim 15 wherein the DPCCH-HS has a structure with three fields including:
a transmission status field for carrying acknowledgement/negative acknowledgement (ACK/NACK) information;
a channel qualifier identifier (CQI) field; and
a TSN field.

17. The method of claim 15 wherein each field is located in one or more timeslots of a transmission time interval (TTI) of the DPCCH-HS.

18. The method of claim 14 wherein the TSN status report message includes a reordering queue indicator used to place the data block including the missing TSN in the specific location in the particular reordering queue.

19. The method of claim 14, further comprising:
detecting a signal interpreted to be an acknowledgement (ACK); and
based on the TSN status report message, determining that the detected signal was interpreted incorrectly and is actually a negative acknowledgement (NACK).

* * * * *

UNITED STATES PATENT AND TRADEMARK OFFICE
CERTIFICATE OF CORRECTION

PATENT NO.       : 7,430,206 B2
APPLICATION NO.  : 10/434882
DATED            : September 30, 2008
INVENTOR(S)      : Terry et al.

It is certified that error appears in the above-identified patent and that said Letters Patent is hereby corrected as shown below:

At column 1, line 63, before the word "architecture" delete "MAC hs" and insert therefor --MAC-hs--.

At column 3, line 17, before the words "are timely", delete "processes" and insert therefor --processors--.

At column 3, line 45, before the words "will be" delete "$B1_1$ $B1_N$" and insert therefor --$B1_1$-$B1_N$--.

At column 4, line 14, after "B", insert --,--.

At column 4, line 31, before the word "scheduled", delete "maybe" and insert therefor --may be--.

At column 5, line 26, before the word "block" delete "prior art a" and insert therefor --a prior art--.

At column 6, line 16, before the word "entity" delete "is".

At column 6, lines 20 & 21, after the word "priority", delete "pre-empty" and insert therefor --pre-empt--.

At column 6, line 51, after the word "hereinafter" delete "In" and insert therefor --, in--.

At column 7, line 13, after "TTI", delete "is".

UNITED STATES PATENT AND TRADEMARK OFFICE
CERTIFICATE OF CORRECTION

PATENT NO. : 7,430,206 B2
APPLICATION NO. : 10/434882
DATED : September 30, 2008
INVENTOR(S) : Terry et al.

It is certified that error appears in the above-identified patent and that said Letters Patent is hereby corrected as shown below:

At column 7, line 62, before the word "properly", insert --be--.

Signed and Sealed this

Twenty-third Day of December, 2008

JON W. DUDAS
*Director of the United States Patent and Trademark Office*